(12) United States Patent
Harambillet

(10) Patent No.: US 11,641,491 B2
(45) Date of Patent: May 2, 2023

(54) MULTIMEDIA SERVER FOR AN ONBOARD ENTERTAINMENT SYSTEM, ONBOARD ENTERTAINMENT SYSTEM COMPRISING SUCH A SERVER, METHOD FOR CONTROLLING STORAGE IN SUCH A SERVER AND ASSOCIATED COMPUTER PROGRAM

(71) Applicant: THALES, Courbevoie (FR)

(72) Inventor: Pierre Harambillet, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/764,011

(22) PCT Filed: Sep. 25, 2020

(86) PCT No.: PCT/EP2020/076903
§ 371 (c)(1),
(2) Date: Mar. 25, 2022

(87) PCT Pub. No.: WO2021/058743
PCT Pub. Date: Apr. 1, 2021

(65) Prior Publication Data
US 2022/0377388 A1    Nov. 24, 2022

(30) Foreign Application Priority Data

Sep. 27, 2019  (FR) ...................................... 1910689

(51) Int. Cl.
*H04N 21/214*     (2011.01)
*H04N 21/231*     (2011.01)
*H04N 21/442*     (2011.01)

(52) U.S. Cl.
CPC ... *H04N 21/2146* (2013.01); *H04N 21/23113* (2013.01); *H04N 21/23116* (2013.01); *H04N 21/44204* (2013.01)

(58) Field of Classification Search
CPC ......... H04N 21/2146; H04N 21/23113; H04N 21/23116; H04N 21/44204
See application file for complete search history.

(56) References Cited

U.S. PATENT DOCUMENTS

2005/0262245 A1* 11/2005 Menon ................ H04L 67/1034
348/E5.008
2013/0055321 A1*  2/2013 Cline ............... H04N 21/41422
725/77

(Continued)

OTHER PUBLICATIONS

French Search Report, from the French Patent Office in counterpart French Application No. 1910689, dated Mar. 30, 2020.

(Continued)

*Primary Examiner* — Nicholas T Corbo
(74) *Attorney, Agent, or Firm* — ArentFox Schiff LLP

(57) ABSTRACT

A media server for an on-board entertainment system comprising terminals, the server comprising:
a memory for storing media content;
a distribution module configured to distribute stored media content to terminals;
a controller for controlling the storage of media content in the storage module;
wherein the controller is configured to collect the numbers of accesses via the terminals to the media content, to calculate the value of a retention parameter relating to each item of media content as a function of said number of accesses, and to automatically trigger the continued retention of said media content in the memory or its deletion as a function of at least said calculated value.

8 Claims, 2 Drawing Sheets

(56) References Cited

U.S. PATENT DOCUMENTS

2014/0032660 A1    1/2014   Nguyen
2015/0067750 A1    3/2015   Taylor et al.

OTHER PUBLICATIONS

International Search Report, issued by International Searching Authority in corresponding International Application No. PCT/EP2020/076903, dated Oct. 10, 2020.

* cited by examiner

MULTIMEDIA SERVER FOR AN ONBOARD ENTERTAINMENT SYSTEM, ONBOARD ENTERTAINMENT SYSTEM COMPRISING SUCH A SERVER, METHOD FOR CONTROLLING STORAGE IN SUCH A SERVER AND ASSOCIATED COMPUTER PROGRAM

CROSS-REFERENCE TO RELATED APPLICATIONS

This application is a National Stage Entry of International Patent Application No. PCT/EP2020/076903, filed on Sep. 25, 2020, which claims priority to French Application No. 19 10689, filed on Sep. 27, 2019. The disclosures of the priority applications are incorporated in their entirety herein by reference.

The invention relates in particular to a media server for an on-board entertainment system comprising entertainment user terminals for a passenger transport vehicle, said media server being intended to be carried on board said vehicle and to be connected to at least one on-board entertainment user terminal via an on-board local area network, the media server comprising:
- a storage module configured to store media content;
- a distribution module configured to distribute, via the on-board local area network, to at least one user terminal at least one item of media content stored in the storage space;
- a storage control module, configured to control the storage of the media content in the storage module.

Such mobile entertainment systems can be found in aircraft, mainly on long-haul commercial aircraft, and are also known as In-Flight Entertainment (IFE) systems.

In a manner known per se, such an IFE system comprises a plurality of entertainment terminals, also referred to as user terminals, typically in the form of individual screens or tablets. Each entertainment terminal is integrated, for example, in the passenger seat or in the seat in front of the passenger.

These terminals allow passengers to view media content during the flight (e.g. films, TV programmes, games or music) and to be informed about the progress of the flight (altitude, speed, current position, progress, etc.).

In some cases, these terminals also provide some practical information, for example about the airport of arrival, and announcements by the crew in audio and/or video form.

The entertainment terminals are usually connected via a wired or wireless network to the on-board media server which is also part of the IFE system.

Depending on different possible implementations of the IFE system, to access the computer content and implement its functions, each terminal accesses the on-board media server via the network or uses its own storage space.

Some systems also offer entertainment terminals that can implement at least some of these functions from their storage space and some from the on-board media server.

Thus, in order to be accessible, the computer content is first loaded onto the on-board media server and then potentially distributed to the entertainment terminals via the on-board local area network for storage in their storage space.

The volume of media content on board is growing, and with increasing resolutions (2K, 4K, 8K, etc.) and quality video standards (HDR, HDR10, HDR10+, Dolby Vision), the volume of storage required will continue to grow.

In addition, each item of media content is often stored several times in the storage space to compensate for hardware failures.

To this end, according to a first aspect, the invention proposes a media server for an on-board entertainment system of the aforementioned type characterised in that the storage control module is configured to collect values relating to media content and representative of the numbers of accesses via user terminals to the respective media content by passengers, for calculating the current value of a retention parameter relating to each item of media content stored in the storage module as a function of said collected representative values relating to said content and for automatically triggering the continued retention of said media content in the storage module or its deletion as a function of at least said calculated current value.

In this way, the invention enables the efficient control and updating of storage space usage, limits the number of additions and deletions of content, facilitates the release of storage space, and minimises the bandwidth used on the server for processing the storage of media content.

In certain embodiments, the media server for an on-board entertainment system according to the invention further comprises one or more of the following features:
- the storage control module is configured to calculate the current value of the retention parameter relating to the media content as a function of a value representative of a transport time by the mobile device divided by said number of accesses to said content during said time;
- each item of media content is associated with one of a predefined set of replication levels and the storage control module is configured to control storage in the storage module of a number of replications of each item of content equal to its associated replication level, wherein the storage control module is adapted to determine that an available space in the storage space is not sufficient to store the content in accordance with the associated replication levels, to then order media content in descending order of their current retention parameter value and, starting from the media content associated with the maximum value and successively considering each of said successive items of media content thus ordered, to replace their replication level with the next-highest level in the predefined set of replication levels, until the available space is determined to be sufficient;
- a respective storage volume in the storage space is associated with each of the replication levels of the predefined set of replication levels, and the storage control module is configured to determine for each storage volume successively starting with the one associated with the largest replication level that the space available in said volume is not sufficient to store the content according to said replication level, to then order media content associated with said level in descending order of their current retention parameter value and, starting with the item of media content associated with the maximum value and successively considering each of said successive items of media content thus ordered, to replace said replication level associated with said content with the next-highest level in the predefined set of replication levels until the available space in said volume is determined to be sufficient;
- the values relating to media content collected by the storage control module and used to calculate the current value of a retention parameter relate to accesses to the content by passengers of the vehicle carrying the server or to accesses to the content by passengers of a fleet of vehicles comprising the vehicle carrying the server.

In another aspect, the present invention provides an electronic entertainment system for use in a vehicle, said system comprising:
- at least one entertainment user terminal; and
- a media server according to the first aspect of the invention, connected to each entertainment terminal via an on-board local area network.

In another aspect, the present invention proposes a method for controlling storage of media content in a media server of an entertainment system comprising on-board entertainment user terminals in a passenger transport vehicle, said server being connected to at least one on-board entertainment user terminal via an on-board local area network, according to which a storage module stores media content and a distribution module distributes, via the on-board local area network, to the at least one user terminal, at least one item of media content stored in the storage space; and wherein a storage control module controls the storage of the media content in the storage module; said method being characterised in that the storage control module implements the following steps:
- collecting values relating to media content and representative of the number of accesses via user terminals to the respective media content by passengers;
- calculating the current value of a retention parameter relating to each item of media content stored in the storage module as a function of said collected representative values relating to said content and automatically triggering the continued retention of said media content in the storage module or its deletion as a function of at least said calculated current value.

The invention also relates to a computer program comprising software instructions, which, when carried out by a computer, implement a monitoring method as defined above.

Characteristics and advantages of the invention will become apparent upon reading the following description, given only as a nonlimiting example, referring to the attached drawings, in which.

Figure 1:
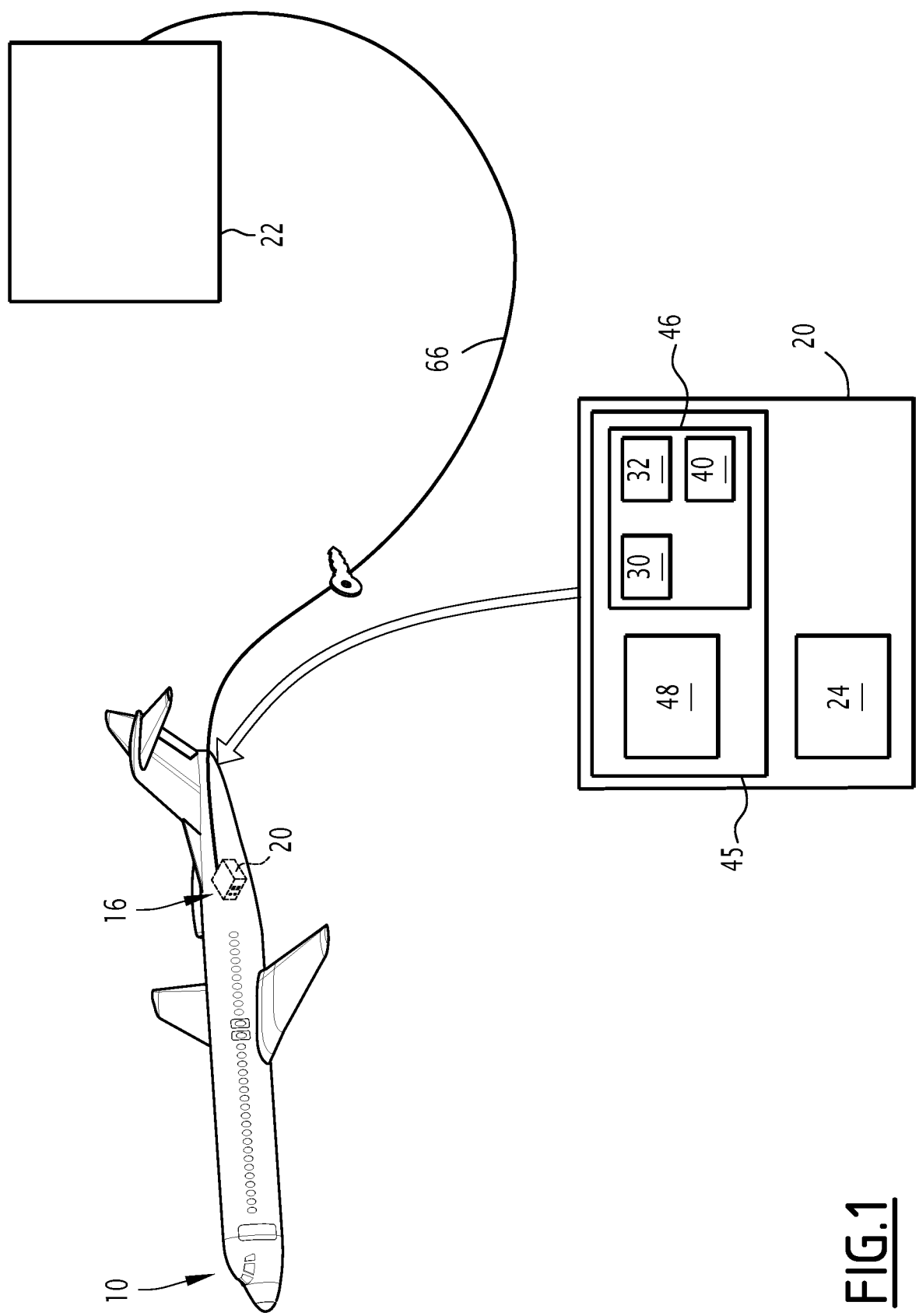
FIG. 1 is a schematic view of an aircraft equipped with an electronic entertainment system comprising entertainment terminals, not shown, and a media server in one embodiment of the invention.

In FIG. 1, an aircraft 10 is shown in one embodiment of the invention: the aircraft 10 is equipped with an electronic entertainment system 16 comprising entertainment user terminals, not shown, and a media server 20.

The aircraft 10 is preferably an aircraft, in particular a commercial aircraft, such as a long-haul aircraft. The aircraft 10 is capable of carrying passengers, particularly a few dozen or even a few hundred passengers.

The entertainment system 16 on board the aircraft 10 is configured to broadcast media content to the passengers of the aircraft 10, in particular during the flight (e.g. movies, TV programmes, games, or music), and/or information on the course of the flight (altitude, speed, current position, distance traveled, etc.).

As an optional extra, the entertainment system 16 is configured to broadcast practical information about, for example, the arrival airport, for example via announcements in audio and/or video form.

Each entertainment terminal is known per se, and is connected to the media server 16 via a local area network, not shown, on board the aircraft 10.

Each entertainment terminal is, for example, attached to or integrated into the passenger's own seat, or is attached to or integrated into the seat back in front of the passenger's seat. The seats are typically arranged in rows within the aircraft 10.

Each entertainment terminal, also known as a user terminal, comprises a human-machine interface (HMI), a processing module, an application module and a telecommunications module. The HMI includes, for example, a touch screen, or a screen and keyboard. The application module comprises one or more application blocks. The telecommunication module comprises a control block and one or more telecommunication interfaces adapted to transmit and receive data. The processing module is adapted to control and coordinate the operation of the application module, the HMI and the telecommunication module. In one embodiment, it comprises a processor and a memory, for example a hard drive or any other storage space capable of storing computer content received in particular via the telecommunications module.

Each entertainment terminal is adapted to deliver to passengers the multimedia computer content offered by the in-flight entertainment system. For example, following a passenger's selection of a field displayed on the HMI screen of their entertainment terminal, the processing module is adapted to identify that a selection menu of one of the applications, for example a list of movies, should then be displayed. Then, upon detection of a film selection by the passenger, the processing module is adapted to trigger the display of the movie on the screen. In addition to films, the content delivered by the applications can be diverse: media content, e.g. movies, TV programmes, games or music, flight parameters (altitude, speed, etc.) and progress (e.g. using a "moving map"), and announcements (audio and/or video) by the crew. The display is capable of displaying images corresponding to computer content distributed from the media server 20. More precisely, the computer content is received via the telecommunication module from the media server 20 in the form of a stream or stored in the memory of the terminal, after having been previously downloaded from the media server 20 via the said telecommunication module.

Once a passenger has ordered the media content to be played via the entertainment terminal's HMI, the passenger can then access it, with the media content being played (via audio and/or video) on the HMI of their user terminal. The user can thus have access to it for the entire duration of the content, or only a part of this duration if they stop earlier or if they only view some excerpts of it.

The media server 20 is connected to at least one entertainment terminal, preferably to each entertainment terminal, via an on-board local area network.

The media server 20 can be connected to an external electronic content delivery device 22 via a communication link 66, for example encrypted. In one embodiment, this connection is only implemented when the aircraft 10, on which the server is carried, is on the ground, parked at the airport, as shown in FIG. 1 (the link 66 may be wired or wireless). In another embodiment, this connection is satellite-based and can take place even in flight.

The media server 20 comprises an electronic data storage module 24, an electronic storage control module 30, an electronic module 32 for interfacing with the data storage module and an electronic distribution module 40.

In the example shown in FIG. 1, the media server 20 comprises an information processing unit 45 formed for example by a memory 46 and a processor 48 associated with the memory 46.

In the example of FIG. 1, the storage control module 30, the interface module 32 and the distribution module 40, are each in the form of software which can be executed by the processor 48. The memory 46 of the media server 20 is then able to store storage control software, interface software and distribution software. The processor 48 in this case is able to execute each of the software programs.

In a variant not shown, the storage control module 30, the interface module 32 and the distribution module 40 are each in the form of a programmable logical component, such as a FPGA (Field Programmable Gate Array), or as a dedicated integrated circuit, such as an ASIC (Application-Specific Integrated Circuit).

When the media server 20 is in the form of one or more pieces of software, that is to say in the form of a computer program, it is also capable of being stored on a computer-readable medium, not shown. The computer-readable medium is, for example, a medium that can store electronic instructions and be coupled with a bus from a computer system. For example, the readable medium is an optical disk, magneto-optical disk, ROM memory, RAM memory, any type of non-volatile memory (for example EPROM, EEPROM, FLASH, NVRAM), magnetic card or optical card. The readable medium in such a case stores a computer program comprising software instructions.

The data storage module 24 is adapted to store the media content to be provided to the entertainment terminals. The data storage module 24 comprises, for example, multiple mass data storage cards on which that content is stored.

The local area network on board the aircraft 10 is a wired-only network, or a partially wired and partially wireless network, or a wireless-only network.

When the on-board local area network is partially wired and partially wireless, the media server 20 is for example wired to an entertainment terminal in each row of seats, and said terminal wired to the media server 20 is then connected via wireless links to the other terminals in the row of seats.

Each wireless link is, for example, a radio link, such as a link complying with at least one version of the IEEE 802.11 standard, also known as the Wi-Fi™ standard, or a link complying with the Li-Fi standard, for example the IEEE 802.15.7 standard.

The storage control module 30 is configured to control the storage of the media content in the data storage module 24, in particular to determine, in the data storage module 24, which media content to delete and/or which content to be retained and/or the number of replications to be stored for the content to be retained.

The storage control module 30 is configured to collect, for each item of media content considered in the storage module 24, the current value, known as AS, of the "audience score" indicator, which is representative of the number of views of the media content (to cover also the case of purely audio content for which the term views is inaccurate, we will speak hereafter of accesses).

Optionally, the AS value is further weighted by the number of "like" and "dislike" ratings left by passengers (example: AS×number of "likes"/number of "dislikes", or by a view duration ratio (e.g. the average time spent by passengers viewing the content divided by the total duration of the content).

AS can also be weighted by flight type (day/night), flight context (flight duration among short/medium/long haul), flight geography (departure airport, arrival airport), by seat class (business/economy/etc.).

In one embodiment, AS is weighted according to the aircraft's planned future routes (for the same criteria as described here for the aircraft's past routes).

In embodiments, the storage control module 30 is configured to determine, for each media content stored in the storage module 24, additionally the current value of the "decay rate" indicator, hereinafter referred to as DR indicator, proportional to the number of flight hours of the aircraft divided by the number of views of the content, i.e. DR=K. flight_hours/AS, with K being a constant that sets the value based on a nominal number of views over a certain time range.

The storage control module 30 is configured to determine, based on the calculated DR value, what will be the fate of the media content within the storage module, i.e. whether the content is to be deleted or retained and in the latter case, how many replications of the content are stored.

In one embodiment, the storage control module 30 is in particular adapted to implement the operations to be performed by it which are described below with reference to FIG. 2.

The more passengers have had access to a content, the higher the number of replications of the resulting content; for each given period of time without the content being seen, the number of replications of the resulting content is greatly reduced; the available storage space and the number of replications so far stored are also taken into account.

The storage control module 30 is configured to provide the interface module 32 with the commands to remove all content, remove replicated content, or add replicated content so that the status in the storage module 24 for the media content under consideration is in accordance with the fate determined in accordance with the current DR value.

The interface module 32 is adapted to interface with the storage module 24 to:
  delete all or some copies of the media content, and to choose which of the copies are affected if any; or
  create additional copy(ies) of the media content and choose their location in the storage module 24.

It will be further noted that when new media content is initially provided by the external equipment 22 via the communication link 66, it is assigned for example an initial default number of replications, and the interface module 32 is adapted to then interface with the storage module 24 to implement storage of the new media content with that initial default number of replications.

The distribution module 40 is configured to distribute the corresponding media content to each entertainment terminal. For example, the distribution module 40 is configured to stream the corresponding media content to each entertainment terminal (in case of multiple replications of the content present in the storage module 24, the interface module 32 is configured to select whichever one of the replications is used). In this case, the user of the entertainment terminal can access the content as it is streamed.

Figure 2:
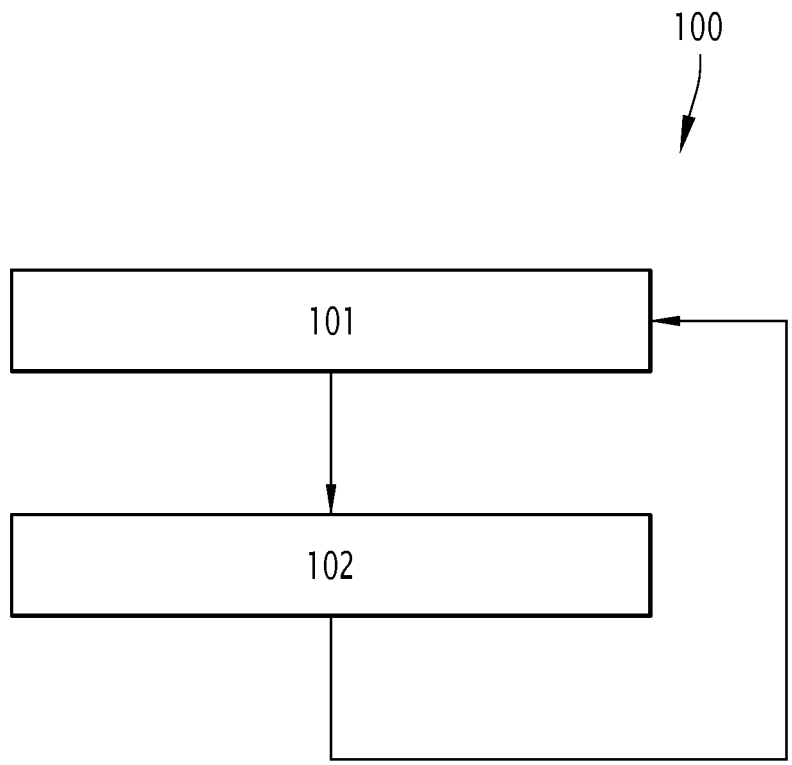
FIG. 2 is a flowchart of steps implemented in one embodiment of the invention.

The operation of the media server 20 will now be explained, in particular with the aid of FIG. 2 showing a flowchart 100 of the storage control method according to the invention, the method being implemented by the media server 20.

Consider a current state of the storage module 24, storing media content, each associated with a number of respective stored replications, for example equal to $n_1$, $n_2$ or $n_3$, where $n_1 < n_2 < n_3$, when three distinct replication values are considered (of course, there may be any number N greater than 2 of distinct replication values considered) and for example here where N=3, the numbers $n_1$, $n_2$ and $n_3$ are chosen such that $n_1=1$, $n_2=2$ and $n_3=3$.

These items of content were initially provided by the external electronic equipment 22, then stored in the storage module 24 and are distributed by the distribution module 40 to the user terminals, where the passengers can then consult that content. The logs of the perusal of the content by the passengers, indicating in particular the content perused, the date and duration of perusal, and optionally an index of the passenger's satisfaction following their perusal of the content, are collected by the terminals and then routed (possibly after agglomeration and processing to determine the indicators) via the local area network to the storage control module 30 which collects them.

The set of steps 100 is for example implemented regularly, for example, every period T or whenever new content is provided.

In one embodiment, the new media content to be stored in the storage module 24 are associated with a predefined number of replications from among $n_1$, $n_2$ or $n_3$, which will not be changed before a predetermined time (e.g. until the next period T) by the process described below implemented by the storage control module 30.

In an initial step 101, the storage control module 30 first places the media content identified as to-be-deleted, if any, in a list L of content to be deleted.

Then, the storage control module 30 determines whether the space available in the storage module 24, after deleting the content identified as to-be-deleted in the list L, is sufficient to accommodate the new content to be stored with their predefined replication value.

If it is, then step 102 is implemented.

If not, the storage control module 30 collects, for each other item of media content stored in the storage module 24 and not identified as to be deleted, the current AS value and then calculates the current value of the indicator DR, and then sequentially orders the content by its current DR value.

Then, considering each such item of content in turn starting from the one with the highest DR, the storage control module 30 updates the number of replications associated with it by replacing the number of replications associated with it with the next-highest number of replications in the set of N numbers under consideration (i.e. if the number of replications associated with such content is $n_i$, then ni is replaced by $n_{i-1}$ for i≠1; and if i=1, then the content, i.e. its $n_1$ replications if any, is identified as to-be-deleted.

After each update, the storage control module 30 updates the list of content to be deleted if necessary (if i was equal to 1), and then determines whether the space available in the storage module 24, once the number of replications of the content in question has been updated in this way, is sufficient to accommodate the new content to be stored with their predefined replication value.

If it is, then step 102 is implemented.

If not, the storage control module 30 then considers the next content in the list in order of DR values and repeats the updating of the number of replications. This process is repeated until enough space is freed to store the new content in a number of copies equal to their predefined replication value.

In step 102, the storage control module 30 provides the interface module 32 with commands to delete all of the content present in the list of content to be deleted, commands to delete replication(s) relating to the items of stored content whose replication value was updated in step 101, as well as commands to store the new media content associated with their predefined replication values. The interface module 32 then interfaces with the storage module 24 to:
delete all or only one or some copies of the media content, and to choose which copies, if any, are to be deleted; or
store the additional copy(ies) of the media content and to choose the corresponding location in the storage module 24.

Step 101 therefore implements comparative logic processing from which the new items of content to be stored are excluded.

In one embodiment, the initial step 101 is performed as shown below:

The storage control module 30 first places the media content identified as to-be-deleted, if any, in the list L of content to be deleted.

Then given a maximum storage volume Vi predefined in the storage module 24 for the replications of each item of media content associated with a replication value $n_i$, i=1, 2, 3 in this case, the storage control module first considers the volume V3 associated with the maximum replication value and determines whether the volume V3, once the identified content associated with the replication value $n_3$ and therefore as to-be-deleted from V3 have been deleted, can accommodate the new content to be stored with the predefined replication value $n_3$.

If not, the storage control module 30 collects for each item of stored media content associated with the replication value $n_3$ and not identified as to be deleted, the current AS value and then calculates the current value of the indicator DR as a function of that AS value, and then sequentially orders the content by its current DR value.

Then, considering each of these items of content one after another, starting from the one with the highest DR, the storage control module 30 updates the number of replications associated with it by replacing the number $n_3$ of replications associated with it with the next-highest number of replications, i.e. $n_2$. These items of content are therefore no longer considered part of volume V3, but rather are thereafter considered part of volume V2.

After each update, the storage control module 30 determines whether the available space thus freed up in volume V3 allows the new content to be stored with the replication value $n_3$, and if not repeats the process, looking at the content with the next-highest DR, until the space freed up allows these new items of content to be stored in V3.

Next, the same steps are carried out, this time for volume V2, treating the content associated with the replication value $n_2$ that is present in the list of L items of content to be deleted, as to be deleted from V2, the new items of content to be stored with the replication value $n_2$, and the content whose replication value has been updated to $n_2$ above.

At the end of these steps applied to volume V2, if applicable, certain content previously stored in V2 has had their replication value updated by the storage control module 20 to the value $n_1$, in order to allow the new content associated with the replication value $n_2$ and the content previously in V3 and reassigned to V2 to be stored in the space V2.

Next, the same steps are carried out, this time for volume V1, treating the content associated with the replication value $n_1$ that is identified in the list of L items of content to be deleted, as to be deleted, the new items of content to be stored with the replication value $n_1$, and the content whose replication value has been updated to $n_1$ above.

The storage control module 30 thus determines whether the space available in volume V1, once these items of content identified in list L have been removed, can accommodate the new content to be stored associated with the replication value $n_1$ and the content whose replication value has been updated to $n_1$ above.

If not, the storage control module 30 collects for each item of stored media content then associated with the replication value $n_1$ and not identified as to-be-deleted, and then accordingly calculates the current value of the indicator DR, then sequentially orders that content by its current DR value. Then, considering each item of content one after another starting from the one with the highest DR, the storage control module replaces the number of replications $n_1$ associated with it with zero i.e. the content is added to the list L of content to be deleted.

After each content update, the storage control module 30 determines whether the space freed up in volume V1 is sufficient, and if not performs a similar treatment with the content corresponding to the next-highest DR.

Step 102 is then carried out with the updates thus determined.

In a so-called autonomous embodiment, the current indicator(s) values collected are specific to the aircraft 16 and to the use of the media server 20 within that aircraft.

In another semi-autonomous embodiment, the AS indicator slaves the audience score specific to the aircraft 16 to a score consolidated by an external authority and supplied to the storage control module 30 (this score could be consolidated by a company at the level of its fleet of aircraft, for example, or refined on a route regardless of the aircraft flying the route). This semi-autonomous embodiment also makes it possible, in one embodiment, to automatically force the value of the DR indicator in order to automatically delete a given item of content (end of licence, editorial choice, etc.), to cancel it for contractual reasons or, on the contrary, to give it priority.

The present invention thus makes it possible to regularly and automatically update the media content stored in an on-board entertainment system server, to decide whether to delete or continue storing each item of content considered, as well as to optionally decide on how many replications should be stored; the use of the bandwidth necessary for these operations is minimised and controlled, as are the updates of the stored content.

The invention has been described above in the context of an aircraft. It is of course applicable to any entertainment system in a vehicle carrying passengers, e.g. a ship, a bus etc.

The invention claimed is:

1. A media server for an on-board entertainment system comprising entertainment user terminals for a passenger transport vehicle, said media server being intended to be carried on board said mobile vehicle and to be connected to at least one on-board entertainment user terminal via anon-board local area network, the media server comprising:
   a storage module configured to store media content;
   a distribution module configured to distribute, via the on-board local area network, to at least one user terminal at least one item of media content stored in the storage space;
   a storage control module, configured to control the storage of the media content in the storage module;
   wherein the storage control module is configured to collect values relating to the media content and representative of the numbers of accesses via the user terminals to the respective media content by passengers, to calculate the current value of a retention parameter relating to each item of media content stored in the storage module as a function of said collected representative values relating to said content, and to automatically trigger the continued retention of said media content in the storage module or its deletion as a function of at least said calculated current value; and
   wherein the storage control module is configured to calculate the current value of the retention parameter relating to the media content as a function of a value representative of a transport time by the vehicle divided by said number of accesses to said content during said time.

2. A media server for an on-board entertainment system according to claim 1, wherein each item of media content is associated with one of a predefined set of replication levels and the storage control module is configured to command storage in the storage module of a number of replications of each item of content equal to its associated replication level; wherein the storage control module is adapted to determine that an available space in the storage space is not sufficient to store the content in accordance with the associated replication levels, to then order media content in descending order of their current retention parameter value and, starting from the media content associated with the maximum value and successively considering each of said successive items of media content thus ordered, to replace their replication level with the next-highest level in the predefined set of replication levels, until the available space is determined to be sufficient.

3. A media server for an on-board entertainment system according to claim 2, wherein a respective storage volume in the storage space is associated with each of the replication levels of the predefined set of replication levels, and the storage control module is configured to determine for each storage volume successively starting with the one associated with the largest replication level that the space available in said volume is not sufficient to store the content according to said replication level, to then order media content associated with said level in descending order of their current retention parameter value and, starting with the item of media content associated with the highest value and successively considering each of said successive items of media content thus ordered, to replace said replication level associated with said content with the next-highest level in the predefined set of replication levels until the available space in said volume is determined to be sufficient.

4. A media server for an on-board entertainment system according to claim 1, wherein the values relating to media content collected by the storage control module and used to calculate the current value of a retention parameter relate to accesses to the content by passengers of the vehicle carrying the server or to accesses to the content by passengers of a fleet of vehicles comprising the vehicle carrying the server.

5. An electronic entertainment system for use on board a vehicle, the system comprising:
   at least one entertainment user terminal; and
   a media server according to claim 1, connected to each entertainment terminal via an on-board local area network.

6. A method for controlling storage of media content in a media server of an entertainment system comprising on-board entertainment user terminals in a passenger transport vehicle, said server being connected to at least one on-board entertainment user terminal via anon-board local area network, according to which a storage module stores media content and a distribution module distributes, via the on-board local area network, to the at least one user terminal, at least one item of media content stored in the storage space;

and wherein a storage control module controls the storage of the media content in the storage module;

wherein the storage control module implements the following steps:

collecting values relating to media content and representative of the number of accesses via user terminals to the respective media content by passengers;

calculating the current value of a retention parameter relating to each item of media content stored in the storage module as a function of said collected representative values relating to said content and automatically triggering the continued retention of said media content in the storage module or its deletion as a function of at least said calculated current value;

wherein the calculating of the current value of the retention parameter relating to the media content is a function of a value representative of a transport time by the vehicle divided by said number of accesses to said content during said time.

7. The method for controlling storage of media content in a media server of an entertainment system according to claim 6, wherein each item of media content is associated with one of a predefined set of replication levels; said method comprising the following steps carried out by a storage control module:

determining that there is not enough space available in the storage area to store the content in accordance with the associated replication levels;

then ordering media content associated with said level in descending order of their current retention para meter value;

starting with the item of media content associated with the highest value and successively considering each of said successive items of media content thus ordered, replacing their replication level with the next-highest level in the predefined set of replication levels until the available space is determined to be sufficient;

instructing the storing in the storage module of a number of replications of each item of content equal to its associated replication level.

8. A non-transitory computer program product comprising software instructions which, when executed by a computer, implement a method according to claim 6.

* * * * *